United States Patent [19]
Mayo et al.

[11] 3,725,663
[45] Apr. 3, 1973

[54] INTERNALLY MODERATED HEAT SOURCES AND METHOD OF PRODUCTION

[75] Inventors: Kenneth E. Mayo, Nashua; William J. Fretague, Amherst, both of N.H.

[73] Assignee: Sanders Nuclear Corp., Nashua, N.H.

[22] Filed: Jan. 27, 1970

[21] Appl. No.: 6,197

[52] U.S. Cl. ................... 250/106 S, 176/10, 250/84
[51] Int. Cl. ............................................. G21h 5/00
[58] Field of Search ...... 250/84, 106 R, 106 S, 106 T; 176/10

[56] References Cited

UNITED STATES PATENTS

| 3,421,001 | 1/1969 | Fitzgerald et al. | 250/106 S |
| 3,161,504 | 12/1964 | Black et al. | 250/106 S X |
| 3,350,231 | 10/1967 | Hentz | 176/10 X |

Primary Examiner—Archie R. Borchelt
Attorney—Louis Etlinger

[57] ABSTRACT

Internally moderated neutron activation targets are formed of a mass of a stable metal hydride such as thulium hydride preferably in a surrounding casing of a material having a low thermal neutron cross section and a short half life. Heat sources are formed from the targets by irradiation with neutrons with the hydrogen atoms acting as a moderator to reduce the effect of flux depression during neutron activation.

9 Claims, 2 Drawing Figures

PATENTED APR 3 1973  3,725,663

INVENTORS
KENNETH E. MAYO
WILLIAM J. FRETAGUE
BY Richard J. Seligman
ATTORNEY

INTERNALLY MODERATED HEAT SOURCES AND METHOD OF PRODUCTION

BACKGROUND OF THE INVENTION

Radioisotope thermal power sources are known to be useful in the art for powering thermoelectric or thermionic devices such as thermoelectric generators and the like and as thermal sources for maintenance of desired thermal environments for components, systems and/or man. Thulium 170 and/or thulium 171 heat sources are also known in the art. Thulium oxide has often been considered the best fuel form for thulium heat sources because of its high stability both physically and chemically, its high density and high melting point. However, thulium 169 target material has a high neutron absorption cross section and is often used in thin forms in order to enable efficient neutron irradiation. If thick heat sources are made in the order of 1 inch diameter target balls of thulium oxide for example, when the target is neutron activated in a reactor, the center of the heat source target is exposed only to a depleted neutron flux because of the high absorption at the surface of the target. This phenomenon is well-known and is called "flux depression." The flux depression results in a reduced amount of activation at the center of the source.

In order to avoid the effects of flux depression in heat sources, the prior art has turned to fabrication and irradiation of thin wafers which are then assembled after irradiation to form dense sources. While this procedure has advantages, costs of producing heat sources is increased and hazards are introduced in handling of irradiated wafers. Other solutions have included the use of thulium oxide physically mixed with moderator materials such as graphite which are then pressed or sintered. While this solution has advantages, it introduces a reduction in the specific activity or power density of the sources which is undesirable. Most schemes for overcoming the flux depression problem require either post-neutron activation handling of the target, re-packaging or power density reductions due to target dispersion.

Substantially the same problems involved in flux depression are present when forming heat sources of such materials as cobalt and erbium.

Metallic hydrides of fissile elements have been used in the past in order to enhance the fission process in atomic reactors and reactor fuel elements. In reactor fuel elements, it is desirable to have sufficient moderator in a reactor to provide adequate thermal neutrons to sustain a chain fission reaction. Moderator material can be placed anywhere in the near vicinity of the fuel used and if used in sufficient quantities, the moderator will produce its desired effect. A problem which arises with reactor fuels is that of removing the fission induced heat from the fuel and particularly from the fuel core. A common way of removing the heat is to make the fuel in the form of slender pins thus providing short thermal paths from the heat source to a heat sink. The reasons for using metal hydrides in reactors and reactor fuel elements and the problems involved, are quite different from the problems involved in the formation and activation of radioisotope heat sources of the present invention since one of the principal objectives in formation of radioisotope heat sources is high power density and another is minimal handling after activation.

It is an object of this invention to provide internally moderated neutron activation targets which can be neutron activated to form heat sources.

Another object of this invention is to provide internally moderated neutron activation targets in accordance with the preceding object which are capable of reducing the effect of flux depression during neutron activation.

Another object of this invention is to provide internally moderated neutron activation targets which can be produced efficiently with minimized handling and fabrication when converted to high density fuel sources.

Still another object of this invention is to provide an improved method of forming radioisotopic heat sources.

SUMMARY OF THE INVENTION

According to the invention, an internally moderated neutron activation target comprises a mass of a stable metallic hydride capable of high neutron absorption to form radioisotopic heat sources. Preferably the mass of the metallic hydride is surrounded by a casing having a low thermal neutron cross section and a short activation product half life relative to the heat source material. In the preferred embodiment, the metallic hydride is thulium hydride although other metallic hydrides such as cobalt hydride and erbium hydride can be used.

According to the method of this invention, a radioisotopic heat source is formed by selecting a mass of a metallic hydride of a metal capable of being neutron activated to a radioisotopic form for use as a heat source. The mass is formed as a fuel element or target and then irradiated with neutrons to form an activated fuel element capable of use as a heat source. Preferably the heat sources formed have power ratings of at least 0.2 thermal watts per cubic centimeter.

It is a feature of this invention that cold encapsulated radioisotope materials can be formed which can later be neutron activated to form heat sources having high power densities and increased activation uniformity.

BRIEF DESCRIPTION OF THE DRAWINGS

The above and other objects, features and advantages of the present invention will be better understood from the following specification when read in conjunction with the accompanying drawings in which.

DESCRIPTION OF PREFERRED EMBODIMENTS

Figure 1:
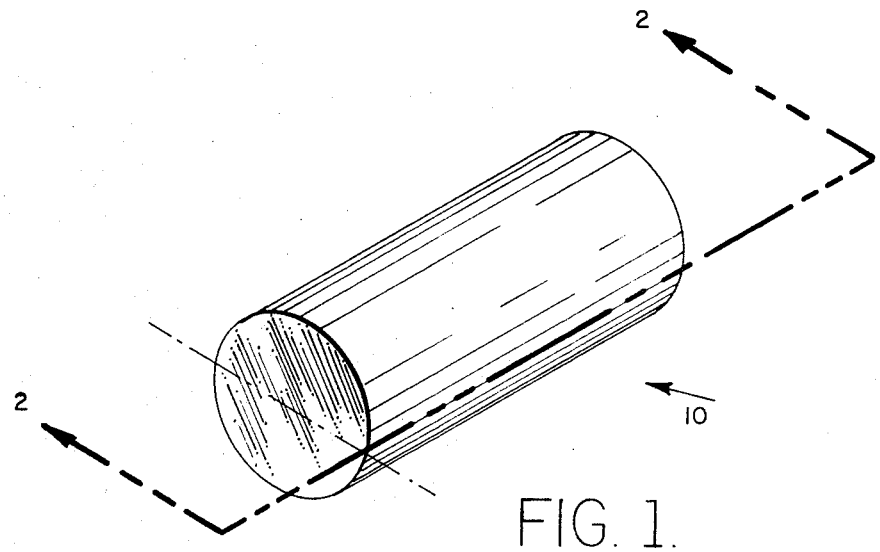
FIG. 1 is a front perspective view of a heat source formed in accordance with a preferred embodiment of this invention; and, FIG. 2 is a cross sectional view thereof taken through line 2—2 of FIG. 1.
Figure 2:
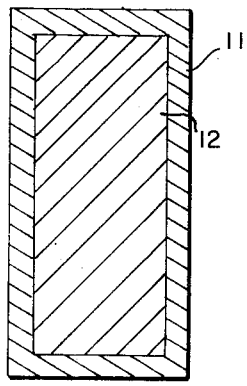

With reference now to the drawings and more particularly FIGS. 1 and 2, an internally moderated neutron activation target in capsule form is shown generally at 10 in FIG. 1, comprising a casing 11 and a mass of a metal hydride 12 enclosed within the casing.

The metal hydrides useful in this invention include thulium hydride, cobalt hydride and erbium hydride. These hydrides have power densities significantly similar to the metals alone or at least oxides thereof customarily used for neutron activation to form radioactive isotopes of the metals. The hydrogen atoms are chemically united with the metals and enable close packing of the metal atoms with internal hydrogen atoms acting as a moderator. Thus, no post compacting step is necessary to increase power density after neutron activation. On the other hand, when thulium 169 or thulium 169 oxide is used as target material, flux depression is quite noticeable even when shapes are used which have one small dimension such as the wafers. The thulium cross section for neutron capture ($\sigma$) is in the order of about 125 barns while thulium has a density of about 9.5 gm/cc. After irradiation, the activated radioisotope wafers of thulium are often separated from their irradiation container and/or compacted by removal of spacers to provide useful energy density for fuel use.

The metal hydrides of this invention can be cold fabricated as encapsulated targets and then neutron activated without the necessity for having one small dimension which later requires compaction to make the compact heat source. The metal hydrides are particularly suitable for cold fabrication as targets because their cross section for neutron capture ($\sigma$) is often much higher for thermal neutrons than for fast neutrons so that neutrons of high velocity which would likely pass through the target atoms unabsorbed can inelastically collide with hydrogen atoms within the structure of a dense preformed target and upon losing velocity, become more susceptible to capture in the target nuclei, thus enhancing activation in the central portions of the target and enabling more uniform neutron activation.

This invention enables preassembly of thulium 169 hydride in a maximized thulium density and thus enables substantial reduction of the effects of flux depression enabling high power density heat sources to be formed without post-activation handling or fabrication. This is accomplished by the intermingling of the hydrogen atoms, which act as a neutron moderator, between and among the thulium atoms without substantially dispersing the thulium atoms because of the relative atomic sizes and packing characteristics. This high density of hydrogen atoms can significantly moderate fast neutrons which are not easily absorbed by thulium target atoms and thus pass through the outer surface of the target easily, to thermal neutrons which are slowed and which are readily absorbed by the thulium atoms in the center and all portions of the target. By providing a high concentration of moderating material (hydrogen atoms) within the dense target material which comprises the metal atoms and placing this in a neutron reactor with a substantial flux of neutrons of higher energy than those easily absorbed by the metal itself, neutrons of readily absorbed energies are essentially generated within the core of the target and a substantially more uniform distribution of absorbed neutrons is achieved throughout the target material.

The metal hydrides of this invention are preferably high compacted in powder form and then compressed in a minimized area within a casing such as 11. The hydrides can be used in powder, granular or other forms. Such hydrides are known to be extremely stable at high temperatures. They retain much of their hydrogen even at red heat and have a higher density of hydrogen per cc than one can normally obtain in either liquid hydrogen, compressed hydrogen gas or water. Since the essential function of the hydrogen atoms is performed in the neutron activation process wherein ample cooling capability is available, and the hydrogen atoms perform no active part in the heat source performance as hydrides, it is desirable but not essential to the performance of this invention that the hydride compound used be completely stable at the highest operating temperatures of the heat source used. In many instances it is desirable to have a reducing atmosphere around the heat source and progressively released hydrogen can so provide this. Selective leaks known in the art for release of alpha-helium can also be used to prevent hydrogen buildup in operational use of the neutron activated heat sources of this invention. These hydrides often possess very metallic-like properties enabling close compaction to high densities. Preferably the mass of the hydrides used are compacted to at least 70 percent of their theoretical maximum density for use as neutron activation targets.

The casing 11 is preferably made of a material which is not capable of significant neutron activation and should therefore have a very low cross section for absorption of thermal neutrons and a short neutron activation product half life. Preferably the casing material should have a thermal neutron cross section of no more than 0.2 barns and the activation products should have a half life of no more than 3 days. It is important that the casing material be non-reactive with the target isotope material at the normal temperatures encountered. The casing forms a sealed encapsulation as by the use of a cylinder with welded end caps as best shown in FIG. 1. Molybdenum is preferred for use as the casing although other materials such as zirconium, tungsten and tantalum are also useful. Preferably the casing material and metal hydride used in the target are stable and non-reactive with each other at temperatures at least as high as 2,000°C.

The metal hydride targets of FIG. 1 can be neutron activated in conventional reactors when desired for use. Thus the targets can be cold fabricated, stored, handled and shipped before neutron activation reducing shielding and safety problems. Neutron activation is preferably carried out at flux levels of from $1 \times 10^{12}$ to at least $5 \times 10^{15}$ neutrons per cm²/sec. for periods of from less than 10 days to at least 700 days. Resulting heat sources have power rating of at least 0.2 thermal watts per cubic centimeter.

In a preferred embodiment, 10 grams of thulium hydride TmH₃ in powdered form are compacted to 80 percent of maximum theoretical density and introduced into a casing formed of molybdenum having a wall thickness of 0.002 inch and an internal volume of 1.4cc with the mass of the thulium hydride completely filling the casing 11. The so formed target is then neutron activated at a flux of $10^{15}$n/cm²/sec for 60 days. The resulting heat source has a power density of approximately 14 watts/cc.

Similar results are obtained when cobalt and erbium hydrides are encapsulated to form targets and later neutron activated. In all cases, the neutron flux level used is sufficient to raise a substantial portion of target metals to their radioisotopic forms such as thulium 170 and/or thulium 171, cobalt 60 and erbium 171.

While specific embodiments of this invention have been shown and described, it should be understood that many variations thereof are possible. For example, the specific shape of the capsule or casings used for the heat sources and targets can vary considerably as can their size. The effect of the chemically united moderator material is to overcome the need for thin sections in neutron activation enabling squares, circles and irregular-shaped radioisotopic heat sources of larger size to be formed rapidly and efficiently with minimized effects of flux depression. In some cases, the mass can comprise a mixture of two or more metal hydrides in accordance with this invention.

What is claimed is:

1. An internally moderated neutron activation target comprising
   a compact mass of a stable metal hydride,
   a surrounding casing having a low thermal neutron cross section and a short half life.

2. An internally moderated neutron activation target in accordance with claim 1 wherein said mass is compacted to at least 70 percent of maximum theoretical density.

3. An internally moderated neutron activation target in accordance with claim 1 wherein said metal hydride is selected from the class consisting of thulium hydride, cobalt hydride and erbium hydride.

4. An internally moderated neutron activation target in accordance with claim 2 wherein said casing has a thermal neutron cross section of no more than 0.2 barns and half life of no more than 3 days.

5. An internally moderated neutron activation target in accordance with claim 2 wherein said casing is formed of a material selected from the group consisting of molybdenum, zirconium, tungsten and tantalum.

6. An internally moderated neutron activation target in accordance with claim 1 wherein said metal hydride is neutron activated to a radioisotopic form suitable for use as a radioisotopic heat source.

7. An internally moderated neutron activation target in accordance with claim 2 wherein said hydride is thulium hydride.

8. A method of forming a radioisotopic heat source comprising
   selecting a mass of metal hydride of a metal capable of being neutron activated to a radioisotopic form for use as a fuel element,
   forming said mass as a compact fuel element,
   and irradiating said metal hydride mass with neutrons to form an activated radioisotopic heat source.

9. The method of claim 8 and further comprising forming said mass as a compact fuel element by encasing it in a sealed casing prior to said irradiating.

* * * * *